UNITED STATES PATENT OFFICE.

JAMES F. O'BRIEN, OF CHICAGO, ILLINOIS.

EXPLOSIVE.

1,070,836.
No Drawing.

Specification of Letters Patent.  Patented Aug. 19, 1913.

Application filed June 3, 1912. Serial No. 701,257.

*To all whom it may concern:*

Be it known that I, JAMES F. O'BRIEN, a citizen of the United States, residing at Chicago, in the county of Cook, State of Illinois, have invented new and useful Improvements in Explosives, of which the following is a specification.

This invention relates to variations and improvements in my explosives of the chlorate carbohydrate class for which I have filed various applications for United States Letters Patent important among which are my applications entitled Explosives, filed Sept. 5, 1911, bearing S. N. 647,474; filed Sept. 20, 1911, bearing S. N. 650,373; filed Oct. 2, 1911, bearing S. N. 652,390; filed Oct. 21, 1911, bearing S. N. 656,529; filed January 11, 1912, bearing S. N. 670,645; filed Feb. 19, 1912, bearing S. N. 678,708. In these applications I have described and claimed in general an explosive consisting of a chlorate of an alkali metal, a carbohydrate, and a silico-aluminous material, the last being preferably brick dust. In the said applications I have described general variations of my fundamental broad conception, using various carbohydrates and other ingredients in various proportions. I have found by repeated experiments that I am enabled to use silica (silicon dioxid) to great advantage in some of my explosives in the place of the brick dust or burnt clay formula set forth; and it is the object of this application to set forth my explosives and to claim the combination of silica therein. I have found that I am able to use silica in practically every situation where I have heretofore used a silico-aluminous material; and the simplest formula for a silica explosive is practically the counterpart of the simplest form of a silico-aluminous explosive. For instance, I may use potassium chlorate and carbohydrate in the proportion three to one and silica in an amount up to approximately fifty per cent. of the total explosive. A typical formula would be as follows:

Potassium chlorate ---------------- 45 parts.
Carbohydrate --------------------- 15 "
Silica ----------------------------- 40 "

I may vary the carbohydrates to suit conditions. I may use any form of sugar, starch, molasses, cereal flour or any similar or equivalent substances. Each different carbohydrate has certain advantages over the others and I may use any of them as circumstances require. For instance, I find it very convenient to use molasses, as that material imports into the combination sufficient moisture for working all of the ingredients into a homogeneous mass and for granulating them before finally drying and preparing for shipment. In some cases I find it greatly advantageous to use starch, either in pure form or as carried by cereal flour. When using cereal flour I use a larger proportion of flour than is set forth in the above formula for carbohydrate, the flour having certain ingredients other than pure starch. But these other ingredients of the flour are not at all detrimental to the action of the explosive; it being supposed that the silica enters into certain reactions with them which increases the total explosive energy.

The amount of silica may somewhat vary. I have found by repeated and exhaustive experiments and commercial use that the addition of the silica to the other ingredients increases the total energy of the explosive. Although an excessive amount of silica will greatly decrease the energy per unit weight of the explosive, I find it practicable to add even as much silica as the total of all other parts without greatly decreasing the explosive energy per unit weight. But the silica does import into the complete combination a certain additional explosive energy; and the proportional additional energy due to the silica is greater than the proportional additional cost thereof, so that the silica explosive is more energetic, cost for cost, than a similar explosive without the silica.

Throughout all of the different forms of my explosive I maintain the general three to one relation between the chlorate and the carbohydrate; but the ratio of these combined ingredients may vary with the silica and other ingredients of the explosive.

I here give some typical formulas for the different forms of my explosive:

1.

Potassium chlorate ------------- 45 parts.
Sugar -------------------------- 15 "
Silica -------------------------- 40 "

2.

Potassium chlorate ------------- 45 parts.
Starch ------------------------- 15 "
Silica -------------------------- 40 "

3.
| | |
|---|---|
| Potassium chlorate | 45 parts. |
| Molasses | 20-25 " |
| Silica | 40 " |

4.
| | |
|---|---|
| Potassium chlorate | 45 parts. |
| Cereal flour approximately | 20 " |
| Silica | 40 " |

To these formulas I may add coloring material or matter for coating or insulating the powder granules, a binder, or any other subsidiary substances. For instance, I find it desirable in some cases to use crude oil in small amounts as a binder, this ingredient being of such nature as to be readily consumed and to enter at least partially into the explosive reaction.

In the above formulas where I have given the proportions of molasses and cereal flour the relative weights of these ingredients are such as to make their pure carbohydrate content one third of the chlorate weight.

Generally speaking, the manufacture of my silica explosive is carried on in a very simple manner without the necessity of heating any of the ingredients. Where sugar is used it is sometimes necessary to first dissolve it, preferably cold, in sufficient water and to then mix the chlorate with the solution. Heat may be used but this is not necessary. In the molasses and starch forms there is required no heat whatever; and it is one of the greatly advantageous features of my explosive that, in the form manufactured for commercial use, there is no requirement for heat or fire within the whole powder plant. I have generally distinguished my explosive to the trade as being one, in the use of which the "blasting cap" was not used, manufactured by a cold, frictionless and non-confined process, these being the great advantages of my explosive as set forth, aside from the feature of economy in manufacture. When making, for instance, the form containing molasses, the chlorate and silica are first placed by gravity in a special mixing machine and the molasses slowly distributed by "dropping" from a molasses container throughout the mass. The mixing machine thoroughly mixes the three ingredients into a homogeneous mass. The mass is then passed by gravity to the granulator where it is subdivided into small particles and is then passed to an insulator where it may be coated with graphite or any other suitable material. A drying operation then finishes the powder ready for commercial use.

In point of explosive energy, the herein described explosive compares well with sixty per cent. to eighty per cent. dynamite, depending upon the exact formula followed. It cannot be detonated by concussion, jar, shock or vibration unless heat sufficient for ignition is generated; neither can it be exploded by ignition when unconfined. It needs ignition (heat) in a confined space in order to detonate. It is thoroughly safe to handle and does not deteriorate by exposure. And, finally, it has the great advantage of exploding in such manner as to localize its effects; that is, it does not detonate after the manner of nitro-gylcerin and other high explosives, but rather after the manner of a slow burning powder. But it has the advantage over the ordinary slow burning powder of having a total energy comparable with that of the best dynamite.

Having described my invention, I claim:

1. An explosive, consisting of a chlorate of an alkali metal, a carbohydrate, and silica.

2. An explosive, consisting of a chlorate of an alkali metal and carbohydrate in the approximate proportions three to one, and silica.

3. An explosive, consisting of a chlorate of an alkali metal, starch, and silica.

4. An explosive, consisting of potassium chlorate, a carbohydrate, and silica.

5. An explosive, consisting of potassium chlorate and starch in the approximate proportions three to one, and silica.

In witness that I claim the foregoing I have hereunto subscribed my name this 24th day of May 1912.

JAMES F. O'BRIEN.

Witnesses:
JEROME McNABB,
ELWOOD H. BARKELEW.